United States Patent [19]

Lollert et al.

[11] 4,295,382

[45] Oct. 20, 1981

[54] IRREGULAR-MOTION MECHANISM

[75] Inventors: Bernd Lollert; Heinrich Risse, both of Düsseldorf, Fed. Rep. of Germany

[73] Assignee: Jagenberg-Werke AG, Düsseldorf, Fed. Rep. of Germany

[21] Appl. No.: 69,150

[22] Filed: Aug. 23, 1979

[30] Foreign Application Priority Data

Aug. 21, 1978 [DE] Fed. Rep. of Germany ....... 2836451

[51] Int. Cl.³ .................... F16H 21/48; F16H 21/18
[52] U.S. Cl. ............................................. 74/68; 74/43
[58] Field of Search ................. 74/63, 65, 66, 67, 68, 74/40, 43, 51

[56] References Cited

U.S. PATENT DOCUMENTS

| | | | |
|---|---|---|---|
| 1,712,444 | 5/1929 | Maltby | 74/65 X |
| 2,228,400 | 1/1941 | Otto | 74/43 |
| 2,248,444 | 7/1941 | Torok | 74/68 X |
| 2,946,228 | 7/1960 | Evrell | 74/68 |
| 3,028,761 | 4/1962 | Cole, Jr. | 74/68 X |

FOREIGN PATENT DOCUMENTS 911687  8/1953  Fed. Rep. of Germany .......... 74/63
2401252  7/1974  Fed. Rep. of Germany .......... 74/63
535511  11/1955  Italy ...................................... 74/65

Primary Examiner—Lawrence J. Staab
Attorney, Agent, or Firm—Sprung, Felfe, Horn, Lynch & Kramer

[57] ABSTRACT

An irregular-motion mechanism comprising two series-connected double cranks each comprising a driving link and a driven link connected thereto by a connecting rod, the driving link of the first double crank and the driven link of the second double crank being mounted for rotation about a common axis, the driven link of the first double crank being rigidly joined to the driving link of the second double crank, the driven link of the first double crank forming an obtuse angle with the driving link of the second double crank the ratio of their lengths being about 2:3 with a length-ratio range of about 3:2 to 5:4 for the driving link of the first double crank and the driven link of the second double crank, and with a length ratio of about 1:1 for the connecting rods of the first and second double cranks. The device provides a considerable increase in power in the extreme positions of irregularity because of the obtuse angle.

1 Claim, 2 Drawing Figures

IRREGULAR-MOTION MECHANISM

BACKGROUND OF THE INVENTION

The invention relates to an irregular-motion mechanism consisting of two series-connected double cranks of which the driving link of the first double crank and the driven link of the second double crank are centrally mounted and the driven link of the first double crank is rigidly coupled to the driving link of the second double crank.

An irregular-motion mechanism of this type offers the advantage over an irregular-motion mechanism whose drive comprises only a single double crank that the driving and driven members remain centrally disposed regardless of the degree of irregularity of motion for which the mechanism is set. A further advantage of the dual double crank over the single double crank is that it permits the mechanism to be set for higher degrees of irregularity. A drawback, on the other hand, is the high loading of the crank with high degrees of irregularity.

SUMMARY OF THE INVENTION

The invention has as its object to increase the power of the mechanism without adding to its complexity.

In accordance with the invention, this object is accomplished in that the driven link of the first double crank and the driving link of the second double crank form an obtuse angle and that the ratio of their lengths is preferably about 2:3 with a length-ratio range of from 3:2 to 5:4 for the driving link of the first double crank and the driven link of the second double crank, and with a length ratio of about 1:1 for the connecting rods of the first and second double cranks.

The invention is based on the discovery that with proper choice of the length ratios of the individual crank links a substantial increase in power in the selected extreme positions for the irregularity of motion is obtainable when the driven link of the first double crank and the driving link of the second double crank are not implemented as a straightened lever as heretofore but rather as an angled lever. In this way, a surprising increase in power is obtained.

BRIEF DESCRIPTION OF THE DRAWINGS

The invention will now be explained in greater detail with reference to the drawings, wherein.

DETAILED DESCRIPTION OF THE INVENTION

Figure 2:
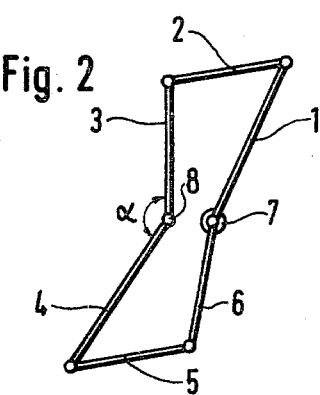
FIG. 2 is a diagrammatic representation of the two double cranks of the irregular-motion mechanism of FIG. 1.

The irregular-motion mechanism shown diagrammatically in FIG. 2 consists of two series-connected double cranks, the first of these being formed by a driving link 1, a connecting rod 2 and a driven link 3, and the second of a driving link 4, a connecting rod 5 and a driven link 6. While the driven link 3 of the first double crank and the driving link 4 of the second double crank form an invariable obtuse angle $\alpha$, the angle formed by the driving link 1 of the first double crank and the driven link 6 of the second double crank is variable. While the common pivot 7 of the driving link 1 of the first crank and the driven link 6 of the second crank is fixed, the common pivot 8 of the driven link 3 of the first crank and of the driving link 4 of the second crank may be displaced along a straight line which passes through the pivot 7 in order to vary the degree of irregularity of the mechanism. The angle formed by the driven link 3 of the first double crank and the driving link 4 of the second double crank, which is preferably between 120° and 160°, and the ratio of their lengths, which is preferably about 2:3 with a length-ratio range of from 3:2 to 5:4 for the driving link of the first double crank and the driven link of the second double crank, and with a length-ratio of about 1:1 for the connecting rod 2 of the first double crank and the connecting rod 5 of the second double crank, make it possible to secure by simple means a considerably increase in power that is surprising.

Figure 1:
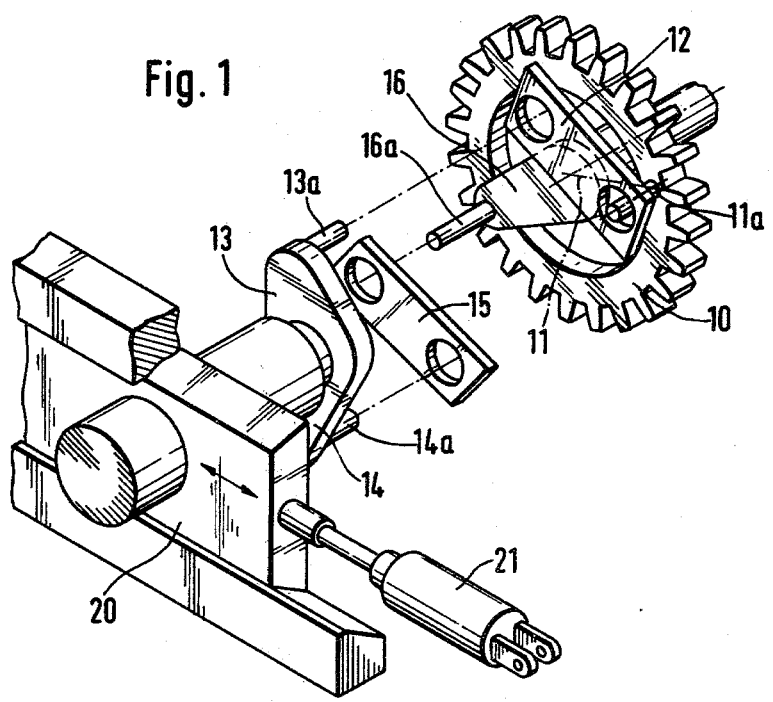
FIG. 1 shows an irregular-motion mechanism.

The mechanism shown diagrammatically in FIG. 2 may be constructionally implemented in the manner shown in FIG. 1. The driving link 1 of the first double crank is formed by a moment arm 11 of the gear 10. In FIG. 1, the moment arm is represented as the distance from the axis of rotation of the gear 10 to the driver 11a. The gear 10, which is set into uniform rotary motion through a reduction gear, for example, is an external gear and carries a driver 11a to which the rigid link 12 serving as connecting rod 2 is coupled at one end. The other end of link 12 is coupled to a driver 13a on an arm 13 which forms the driven link 3 of the first double crank. An arm 14 which forms the driving link 4 of the second double crank is rigidly joined to the arm 13. The arm 14 also carries a driver 14a for a rigid link 15 which is coupled to it and forms the connecting rod 5 of the second double crank. The two arms 13 and 14, which form an angled lever, are pivotably mounted in a slide 20. By means of a positioning device 21 the pivot can be shifted along a straight line and, in particular, brought into alignment with the axis of rotation of the gear 10. The free end of the rigid link 15 serving as connecting rod 5 is coupled to a driver 16a on an arm 16 which forms the driven link 6 of the second double crank. The pivot of arm 16 coincides with the axis of rotation of the gear 10 and corresponds to the pivot 7 in FIG. 2.

It will be appreciated that the instant specification and claims are set forth by way of illustration and not limitation and that various changes and modifications may be made without departing from the spirit and scope of the present invention.

What is claimed is:

1. In an irregular-motion mechanism comprising two series-connected double cranks each comprising a driving link and a driven link connected thereto by a connecting rod, the driving link of the first double crank and the driven link of the second double crank being mounted for independent rotation about a common axis, the driven link of the first double crank being rigidly joined to the driving link of the second double crank, the improvement wherein the driven link of the first double crank forms an obtuse angle of between 120° and 160° with the driving link of the second double crank and the ratio of their lengths is about 2:3, the length-ratio range for the driving link of the first double crank to the driven link of the second double crank is about 3:2 to 5:4, and the length ratio for the connecting rods of the first and second double cranks is about 1:1.

* * * * *